(12) United States Patent
Maeda et al.

(10) Patent No.: US 8,848,226 B2
(45) Date of Patent: Sep. 30, 2014

(54) PRINTING APPARATUS, PRINTING SYSTEM, AND PRINTING METHOD FOR MANAGING A PRINT JOB QUEUE WITH A TIMER

(75) Inventors: Hiroshi Maeda, Osaka (JP); Kenji Ogasawara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/610,358

(22) Filed: Sep. 11, 2012

(65) Prior Publication Data
US 2013/0107308 A1    May 2, 2013

(30) Foreign Application Priority Data

Oct. 31, 2011  (JP) .................................. 2011-238723

(51) Int. Cl.
G06F 15/00  (2006.01)
G06F 3/12  (2006.01)
G03G 15/00  (2006.01)

(52) U.S. Cl.
CPC ............ *G06F 3/1204* (2013.01); *G06F 3/1262* (2013.01); *G03G 15/5091* (2013.01); *G06F 3/1285* (2013.01); *G03G 15/5087* (2013.01)
USPC ......................................... 358/1.15; 358/1.13

(58) Field of Classification Search
USPC ................................................ 358/1.1–1.16
See application file for complete search history.

(56) References Cited

U.S. PATENT DOCUMENTS

| 2003/0007819 | A1 | 1/2003 | Wanda | |
| 2004/0008363 | A1* | 1/2004 | Suzuki et al. | 358/1.14 |
| 2011/0216362 | A1* | 9/2011 | Fukaya | 358/1.15 |

FOREIGN PATENT DOCUMENTS

| JP | 11-119940 A | 4/1999 |
| JP | 2001-75768 A | 3/2001 |
| JP | 2005-149159 A | 6/2005 |
| JP | 2006-244232 A | 9/2006 |
| JP | 2008-40674 A | 2/2008 |
| JP | 2011-022782 A | 2/2011 |

* cited by examiner

*Primary Examiner* — Benny Q Tieu
*Assistant Examiner* — Michael Y Tzeng
(74) *Attorney, Agent, or Firm* — Birch, Stewart, Kolasch & Birch, LLP

(57) ABSTRACT

The printing apparatus is provided for processing a print job received from an information terminal to accumulate the print job sent from the information terminal in an image storage portion, and includes a timer for measuring elapse of a predetermined time from reception of a print job for each user indentified according to user identification information included in the print job; and a control portion for controlling a print order, during the time measurement, so as to skip printing of a print job received from a corresponding user to print a print job not including the user identification information first, and print print jobs received from the corresponding user in a lump after the elapse of the predetermined time.

6 Claims, 4 Drawing Sheets

PRINTING APPARATUS, PRINTING SYSTEM, AND PRINTING METHOD FOR MANAGING A PRINT JOB QUEUE WITH A TIMER

CROSS-NOTING PARAGRAPH

This non-provisional application claims priority under 35 U.S.C. §119(a) on Patent Application No. 2011-238723 filed in JAPAN on Oct. 31, 2011, the entire contents of which are hereby incorporated herein by reference.

FIELD OF THE INVENTION

The present invention relates to a printing apparatus, a printing system and a printing method for printing based on a plurality of print jobs received from an external terminal.

BACKGROUND OF THE INVENTION

A printing apparatus is to print out based on a print job received from an information terminal such as a personal computer (PC: Personal Computer), and shared between a plurality of information terminals. Therefore, recording paper printed out for each user is mixed on a paper discharge tray of the printing apparatus.

Further, for conference materials, a plurality of files created on a PC for each category of materials such as a document file, a spreadsheet file and a drawing file are printed out on recording paper, and the recording paper is combined to be one material. Therefore, when a user uses a multi-functional peripheral shared with other users to print all conference materials, there is a problem that, in the case of consecutively inputting a plurality of files to the multi-functional peripheral, to which a print instruction is however coincidentally given from other user, a record instructed to be output by the other user is mixed among the conference materials.

Additionally, it is also considered that a plurality of files for conference materials are once combined into one file on a PC before printing, however, such a plurality of files differ in types (xls, doc, ppt and dxf), which makes a user cumbersome to combine into one file.

With a technique disclosed in Japanese Laid-Open Patent Publication No. 11-119940, in printing of a plurality of document files, a group ID, a print order ID and the like are specified to a header of a print job on a PC side to print in order of the print order ID for each group ID on a printing apparatus side, so that it is possible to group the plurality of document files for printing. Therefore, there goes a defect such that printing is performed with a print job from other user mixed in execution of printing.

Further, with a technique disclosed in Japanese Laid-Open Patent Publication No. 2001-075768, a user is able to specify a group name and a print order of a print job in a client computer, and by a print server, a plurality of print jobs that are transmitted from the client computer are distinguished between a print job with a specified print order and a print job without the specified print order, then the print jobs are respectively rearranged and arrayed in a specified print order to be transmitted to a printing apparatus. This makes it possible to transmit a plurality of a sequence of print jobs in the order specified to the same printing apparatus in a lump for continuous printing.

Additionally, there is a technique that a printing apparatus stores a plurality of print jobs received from a PC, and a user operates an operation portion such as a touch panel of the printing apparatus to instruct a processing order of the print jobs which are stored.

However, with methods disclosed in the Japanese Laid-Open Patent Publication No. 11-119940 and Japanese Laid-Open Patent Publication No. 2001-075768 described above, operation required to be performed by a user is cumbersome.

SUMMARY OF THE INVENTION

An object of the present invention is to provide a printing apparatus, a printing system and a printing method capable of executing print processing of a plurality of print jobs without being printed with a print job from other user mixed therein for facilitating setting by a user at the time.

An object of the present invention is to provide a printing apparatus for processing a print job received from an external terminal, accumulating the print job sent from the external terminal in a storage portion, comprising: a timer for measuring elapse of a predetermined time from reception of a print job for each user indentified according to user identification information included in the print job; and a control portion for controlling a print order, during the time measurement, so as to skip printing of a print job received from a corresponding user to print a print job not including the user identification information first, and print print jobs received from the corresponding user in a lump after the elapse of the predetermined time.

Another object of the present invention is to provide the printing apparatus, wherein the timer is reset on each reception of the print job from the corresponding user.

Another object of the present invention is to provide the printing apparatus, wherein the timer measures elapse of a predetermined time from reception of a first print job from the corresponding user.

Another object of the present invention is to provide the printing apparatus, wherein the predetermined time is variable.

Another object of the present invention is to provide a printing system with a printing apparatus which receives and processes a print job sent from an external terminal, wherein the external terminal sends the print job to be sent to the printing apparatus including user identification information according to input of an instruction for batch print, and the printing apparatus accumulates the print jobs sent from the external terminal in a storage portion, and includes a timer for measuring elapse of a predetermined time from reception of a print job for each user indentified according to the user identification information included in the print job; and a control portion for controlling a print order, during the time measurement, so as to skip printing of a print job received from a corresponding user to print a print job not including the user identification information first, and print print jobs received from the corresponding user in a lump after the elapse of the predetermined time.

Another object of the present invention is to provide a printing method in which a printing apparatus receives and processes a print job sent from an external terminal, comprising the steps of: sending by the external terminal a print job to be sent to the printing apparatus including user identification information according to input of an instruction for batch print; accumulating by the printing apparatus the print job sent from the external terminal in a storage portion; measuring by the printing apparatus elapse of a predetermined time from reception of a print job for each user identified according to the user identification information included in the print job; and controlling by the printing apparatus a print order, during the time measurement, so as to skip printing of a print job received from a corresponding user to print a print job not including the user identification information first, and print print jobs received from the corresponding user in a lump after the elapse of the predetermined time.

PREFERRED EMBODIMENTS OF THE INVENTION

Figure 1:
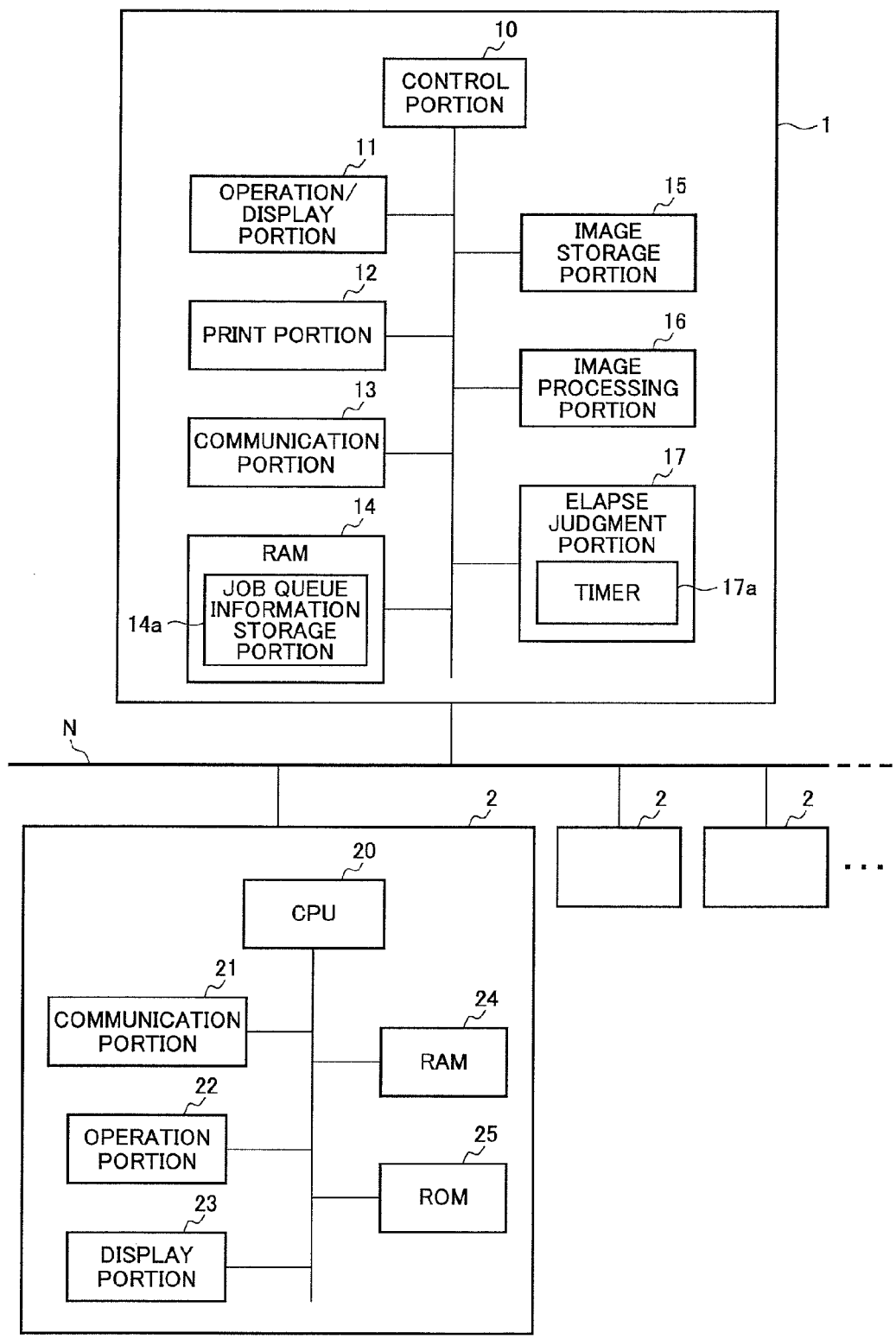
FIG. 1 is a functional block diagram of an example of a printing system as an embodiment of the present invention.

FIG. 1 is a functional block diagram of an example of a printing system as an embodiment of the present invention. The printing system of FIG. 1 has a printing apparatus 1 connected to an information terminal 2 as an external terminal via a network N such as a LAN (Local Area Network) and a WAN (Wide Area Network), and is configured so as to be capable of sending/receiving data.

The printing apparatus 1 is provided for, for example, printing by electrophotography, in which a print job described in a predetermined page-description language is received from the information terminal 2 via the network N to be printed depending on control data included in the print job.

The printing apparatus 1 is comprised of a control portion 10, an operation/display portion 11, a print portion 12, a communication portion 13, a RAM (Random Access Memory) 14, an image storage portion 15, an image processing portion 16 and an elapse judgment portion 17, which are connected to one another through a bus.

The control portion 10 reads a system program and various processing programs that are stored in a ROM (Read Only Memory) by a CPU (Central Processing Unit) into the RAM 14, and performs centralized control of operation of each portion of the printing apparatus 1 according to the read programs.

The operation/display portion 11 includes a display portion composed of an LCD (Liquid Crystal Display) and the like, and an operation portion composed of various operation buttons such as a numerical button and a start button, a switch and the like.

The print portion 12 is comprised of a paper feeding portion, a photoreceptor drum, an exposure portion, a developing portion using a toner, a fixing portion, a discharge portion and the like, in which a sheet having a size and an orientation instructed by control data included in a print job is conveyed from the paper feeding portion according to a print instruction from the control portion 10 for printing an image input from the image storage portion 15 on recording paper.

The communication portion 13 is comprised of, for example, a communication control card such as a LAN card to send/receive and input/output various data to/from the information terminal 2 connected to the network N via a communication line such as a LAN cable.

The RAN 14 is a temporal storage area for a program read from the ROM, input or output data, a parameter and the like in various processing to be executed and controlled by the control portion 10. Further, the RAM 14 includes a job queue information storage portion 14a for storing job queue information as information of an order for processing a printing job (job queue).

The image storage portion 15 is comprised of an HDD (Hard Disc Drive, a nonvolatile semiconductor memory and the like, and stores a print job sent from the information terminal 2.

The image processing portion 16 performs image processing for expanding print data of each page in the print job sent from the information terminal 2 as image data for outputting to the print portion 12.

The elapse judgment portion 17 will be described below.

Next, description will be given for the information terminal 2. The information terminal 2 is comprised of a PC and the like, in which a script in which document data and image data created with application software is converted to a data format capable of being printed with a printing apparatus in a predetermined page-description language to which control data is added is sent as a print job to the printing apparatus 1 via the network N. Note that, the control data includes information for specifying the number of prints, a type of printing paper, a printing form (black and white, color) and the like, batch print information and user identification information described below.

The information terminal 2 is comprised of a CPU 20, a communication portion 21, an operation portion 22, a display portion 23, a RAM 24, a ROM 25 and the like, which are connected to one another through a bus.

The CPU 20 reads out a program specified from among various programs that are stored in the ROM 24 into a work area in the RAM 25 to perform centralized control for each portion according to the program. Moreover, a processing result is stored in a work memory in the RAM 25, while display information for displaying the processing result is generated to be output to the display portion 23. Then, the processing result stored in the RAM 24 is saved in a predetermined area of the ROM 25.

The communication portion 21 is comprised of, for example, a communication control card such as a LAN card to send/receive various data to/from the printing apparatus 1 connected to the network N via a communication line such as a LAN cable.

The operation portion 22 is composed of a keyboard, a mouse and the like to accept operation of a user.

The display portion 23 is composed of, for example, an LCD and the like to display various setting screens such as a print setting screen.

The RAN 24 is a temporal storage area for a program read from the ROM 25, input or output data, a parameter and the like in various processing to be executed and controlled by the CPU 20.

The ROM 25 includes a recording medium in which a program, data and the like are stored in advance, and the recording medium is composed of a magnetic and optical recording medium, or a semiconductor memory. This recording medium is provided so as to be fixed in or equipped so as to be attached/detached freely to/from the ROM 25, and in this recording medium, a system program, various processing programs corresponding to the system, data processed in various processing programs and the like are stored. Specifically, in the ROM 25, a printer driver is stored for performing print control with respect to the printing apparatus 1. The program is stored in a form of a computer-readable program code, and the CPU 20 sequentially executes operation according to the program code.

In such the information terminal 2, when print setting in the printing apparatus 1 is started with the operation portion 22, the CPU 20 displays a print setting screen on the display portion 23 according to a program of the printer driver that is stored in the ROM 25. Additionally, the information terminal 2 sends, when batch print is instructed by the operation portion 22, a print job including batch print information in which setting whether or not to perform the batch print is set to be ON and user identification information of a user who instructs the batch print to the printing apparatus 1 through the communication portion 21. The batch print is, for example, instructed by pressing an "OK" button in the print setting screen in a state where a check box for batch print setting in the screen is checked. Note that, the user identification information is, for example, a login user ID, and registered in the information terminal 2 in advance to be stored in the RAM 24.

The printing apparatus 1 receives a print job as described above from the information terminal 2 through the communication portion 13 for accumulating in the image storage portion 15.

Further, in the printing apparatus 1, the elapse judgment portion 17 judges using a timer 17a whether or not a predetermined time elapses after receiving a print job from a sending user for each of the users of print jobs that are accumulated in the image storage portion 15.

Then, when a judgment is made that the predetermined time elapses for a certain sending user, the print jobs received from the corresponding sending user and accumulated in the image storage portion 15 are processed in a lump by the print portion 12.

Further, in the information terminal 2, the CPU 20 sends, when normal print is instructed rather than batch print, a print job including batch print information in which setting whether or not to perform the batch print is set to be OFF and not including user identification information to the printing apparatus 1 through the communication portion 21.

In this case, the printing apparatus 1 accumulates print jobs in the image storage portion 15 as with a case where a print job including user identification information is received, in which a judgment is not however made by the elapse judgment portion 17, which is different from a case where the print job including the user identification information is received, that is, the print jobs are processed individually by the print portion 12 without waiting a predetermined time. However, in the case of performing batch print or other normal print at the time of receiving a print job, processing is performed after finishing such processing.

Therefore, with the printing apparatus 1, it is possible to process a plurality of print jobs in a lump without being printed with a print job from other user mixed therein. Additionally, operation required to be performed by a user in batch print is only operation for including user identification information in a print job, for example, only check operation of a check box on a print setting screen, which facilitates setting of the batch print.

Subsequently, description will be specifically given for an example of an execution order of a print job, that is, a method of managing a job queue.

The printing apparatus 1 registers a received print job in a job queue to manage an execution order of the print job. User identification information and a timer boot flag described below are stored in the job queue, which are made correspondent with a job number for identifying a job (a simple serial number for management). Note that, when a print job includes batch print information in which setting whether or not to perform batch print is set to be OFF and does not include user identification information, the user identification information of the print job in the job queue becomes vacant.

Figure 2:
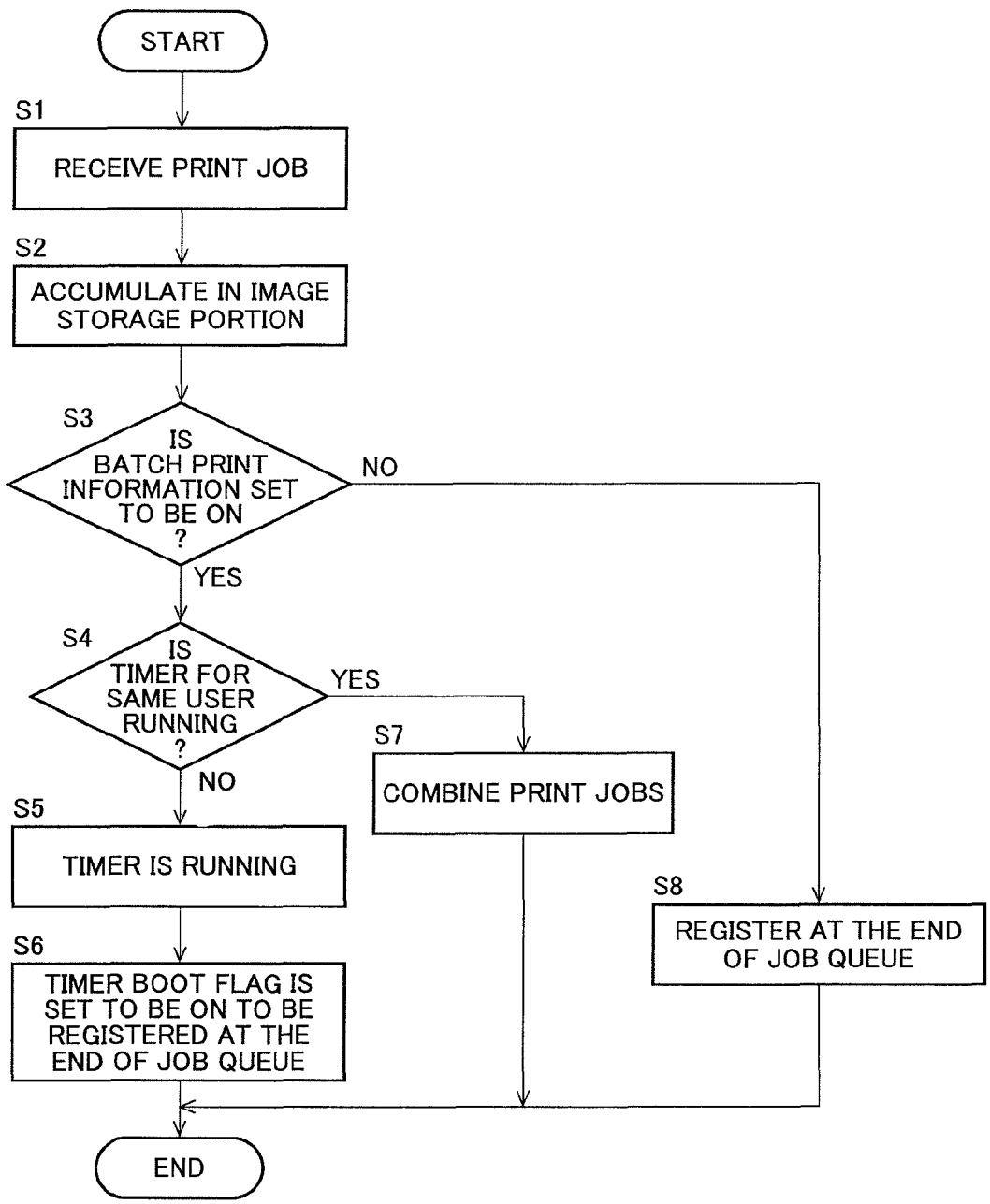
FIG. 2 is a flow chart explaining an example of a method of managing a job queue in the case of receiving a print job in a printing apparatus of FIG. 1.

FIG. 2 is a flow chart explaining an example of a method of managing a job queue in the case of receiving a print job in the printing apparatus 1 of FIG. 1.

In an example of FIG. 2, the printing apparatus 1 receives a print job from the information terminal 2 (step S1) for accumulating in the image storage portion 15 (step S2), and a judgment is made whether or not batch print information of the received print job is set to be ON (step S3).

At step S3, in a case where the batch print information is set to be ON (in the case of YES), that is, in a case where batch print for the print job is set to be performed, a judgment is made whether or not the timer 17a is running for a sending user of the print job (step S4). This judgment is made based on whether or not in a job queue a print job in which the same user identification information as that of the print job is included and the timer boot flag is set to be ON has been registered.

At step S4, when the timer 17a is not running for the sending user of the received print job (in the case of NO), that is, in a case where a print job in which the same user identification information is included and the timer boot flag is set to be ON has not been registered, the timer 17a is started for a corresponding user (step S5), and the print job in which the timer boot flag is set to be ON is registered at the end of the job queue (step S6).

When the timer 17a is running for the sending user of the received print job at step S4 (in the case of YES), that is, in a case where the print job in which the same user identification information is included and the timer boot flag is set to be ON has been registered, the received print job is combined with the registered print job (step S7), that is, a print job held in great account is registered at the end of a rearmost print job among the registered print jobs. At the time, the timer boot flag of the received print job is set to be ON.

Further, at step S3, when batch print information is not set to be ON (in the case of NO), that is, in a case where normal print rather than batch print is set to be performed for the print job, the print job is registered at the end of a job queue (step S8).

Figure 3:
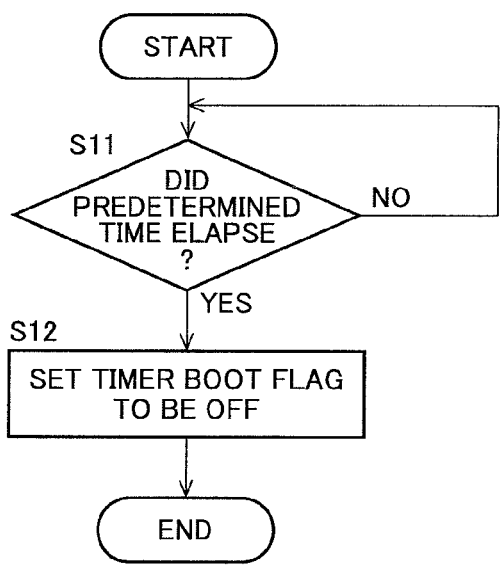
FIG. 3 is a flowchart explaining an example of a method of managing a job queue along with judging processing in an elapse judgment portion of the printing apparatus of FIG. 1.

FIG. 3 is a flowchart explaining an example of a method of managing a job queue along with judging processing in the elapse judgment portion 17 of the printing apparatus 1 of FIG. 1.

In an example of FIG. 3, as a result of the judgment at the elapse judgment portion 17, the printing apparatus 1 judges whether or not there is a user having a predetermined time that elapses after receiving a first print job (step S11), and in the case of absence (in the case of NO), the process returns to step S21, however, in the case of presence (in the case of YES), a job queue is changed so that the timer boot flag of the print job received from the user is set to be OFF (step S12).

Figure 4:
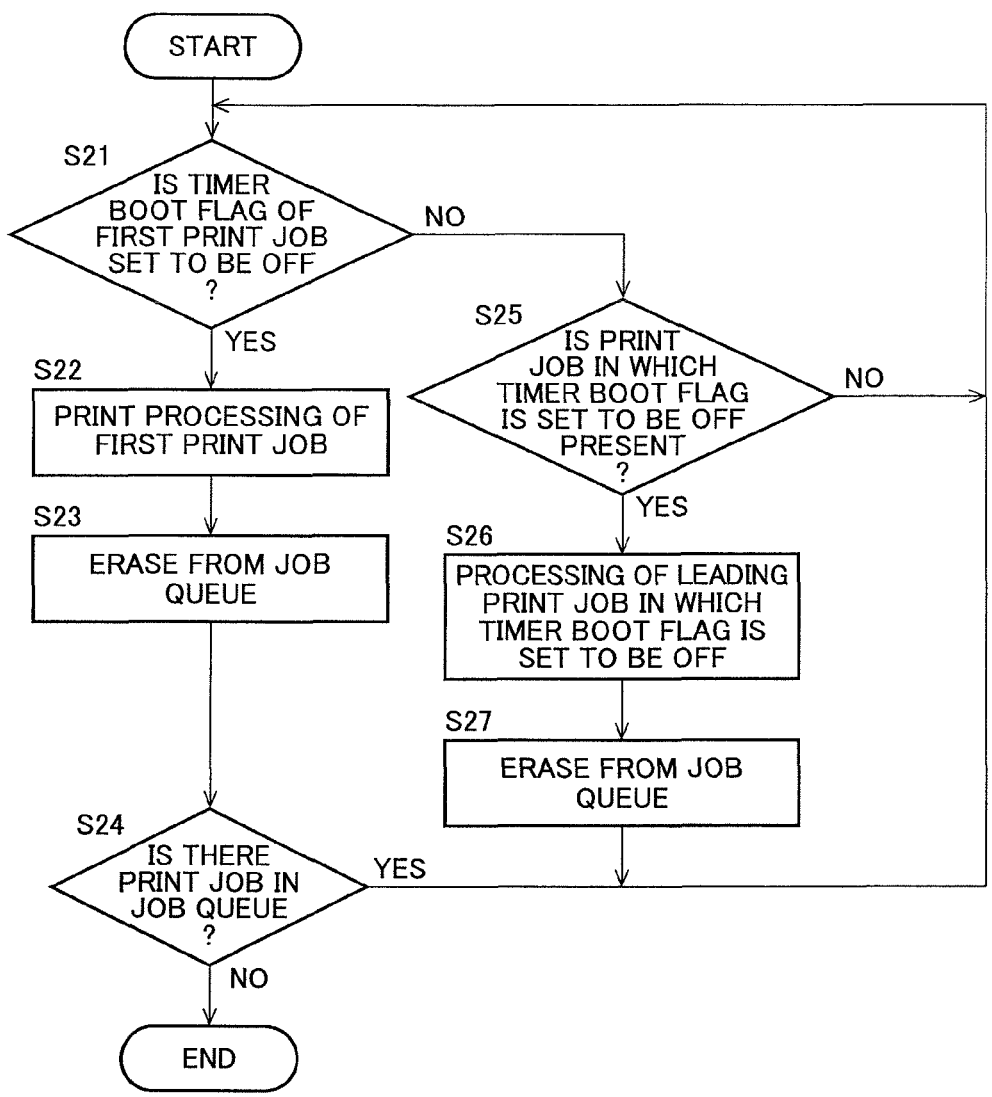
FIG. 4 is a flowchart explaining an example of print processing in the printing apparatus of FIG. 1.

FIG. 4 is a flowchart explaining an example of print processing in the printing apparatus 1 of FIG. 1.

In an example of FIG. 4, the printing apparatus 1 judges, when a print job is registered in a job queue, whether or not the timer boot flag of a leading print job in a job queue is set to be OFF (step S21).

In the case of being set to be OFF (in the case of YES), the leading print job is extracted from the image storage portion 15 to be subjected to image processing by the image processing portion 16, followed by print processing by the print portion 12 (step S22), and the print job is erased from the job queue (step S23). Then, a judgment is made whether or not to still have a print job that has been registered in the job queue (step S24), and in the case of having the print job (in the case of YES), the process returns to step S21, and in the case of not having the print job (in the case of NO), the process is finished.

Further, at step S21, in a case where the timer boot flag of the leading print job in the job queue is set to be ON (in the case of NO), processing of the print job is skipped, and a judgment is made whether or not the print job in which the timer boot flag is set to be OFF is present in the job queue (step S25).

In the case of absence (in the case of NO), the process returns to step S21 as it is, however, in the case of presence (in the case of YES), the leading print job in which the timer boot flag is set to be OFF in the job queue is extracted from the image storage portion 15 to be subjected to image processing by the image processing portion 16, followed by print processing by the print portion 12 (step S26), then the print job is erased from the job queue (step S27) and the process returns to step S21.

Note that, the timer 17a of the elapse judgment portion 17 may clock elapse of a predetermined time from reception of the first print job from a corresponding user as mentioned above, or reset clocking for the corresponding sending user for each reception of a print job including user identification information.

Moreover, the above-described predetermined time is stored in a storage portion such as the RAM 14, and may be changeable from the information terminal 2, or the operation/display portion 11 of the printing apparatus 1.

Hereinabove, according to the present invention, it is possible to execute print processing of a plurality of print jobs without being printed with a print job from other user mixed therein. Further, setting by a user at the time is facilitated.

The invention claimed is:

1. A printing apparatus for processing a print job received from an external terminal, accumulating the print job sent from the external terminal in a storage portion, comprising:
    a timer for measuring elapse of a predetermined time from reception of a user-identified print job for each user identified according to user identification information included in the print job; and
    a control portion for managing a print job queue, wherein the control portion registers a new print job, except for the user-identified print job from the user measured by the timer, after a rearmost print job which is rearmost in the print job queue and registers the user-identified print job from the user measured by the timer after the rearmost print job which is the rearmost print job in the print queue form the corresponding user; and
    a printing portion for processing the print jobs in the print job queue, wherein, if the timer elapses for a leading print job in the print queue, the printing portion skips the leading print job and processes a next leading print job in the print queue for which the timer does not measure, if any.

2. The printing apparatus as defined in claim 1, wherein the timer is reset on each reception of the user-identified print job from the corresponding user.

3. The printing apparatus as defined in claim 1, wherein the timer measures elapse of a predetermined time from reception of a first user-identified print job from the corresponding user.

4. The printing apparatus as defined in claim 1, wherein the predetermined time is variable.

5. A printing system with a printing apparatus which receives and processes a print job sent from an external terminal, wherein
    the external terminal sends the print job to be sent to the printing apparatus including user identification information according to input of an instruction for batch print, and
    the printing apparatus accumulates the print jobs sent from the external terminal in a storage portion, and includes
    a timer for measuring elapse of a predetermined time from reception of a user-identified print job for each user identified according to the user identification information included in the print job; and
    a control portion for managing a print job queue, wherein the control portion registers a new print job, except for the user-identified print job from the user measured by the timer, after a rearmost print job which is rearmost in the print job queue and registers the user-identified print job from the user measured by the timer after the rearmost print job which is the rearmost print job in the print queue form the corresponding user; and
    a printing portion for processing the print jobs in the print job queue, wherein, if the timer elapses for a leading print job in the print queue, the printing portion skips the leading print job and processes a next leading print job in the print queue for which the timer does not measure, if any.

6. A printing method in which a printing apparatus receives and processes a print job sent from an external terminal, comprising:
    sending by the external terminal a print job to be sent to the printing apparatus including user identification information according to input of an instruction for batch print;
    accumulating by the printing apparatus the print job sent from the external terminal in a storage portion;
    measuring by the printing apparatus elapse of a predetermined time from reception of a print job for each user identified according to the user identification information included in the print job; and
    managing a print job queue, including registering a new print job, except for the user-identified print job from the user measured by the measuring step, after a rearmost print job which is rearmost in the print job queue and registering the user-identified print job from the user measured by the measuring step after the rearmost print job which is the rearmost print job in the print queue form the corresponding user; and
    processing the print jobs in the print job queue, wherein, if the predetermined time has elapsed for a leading print job in the print queue, the printing skips the leading print job and processes a next leading print job in the print queue for which the measuring step does not measure, if any.

* * * * *